Figure 1:
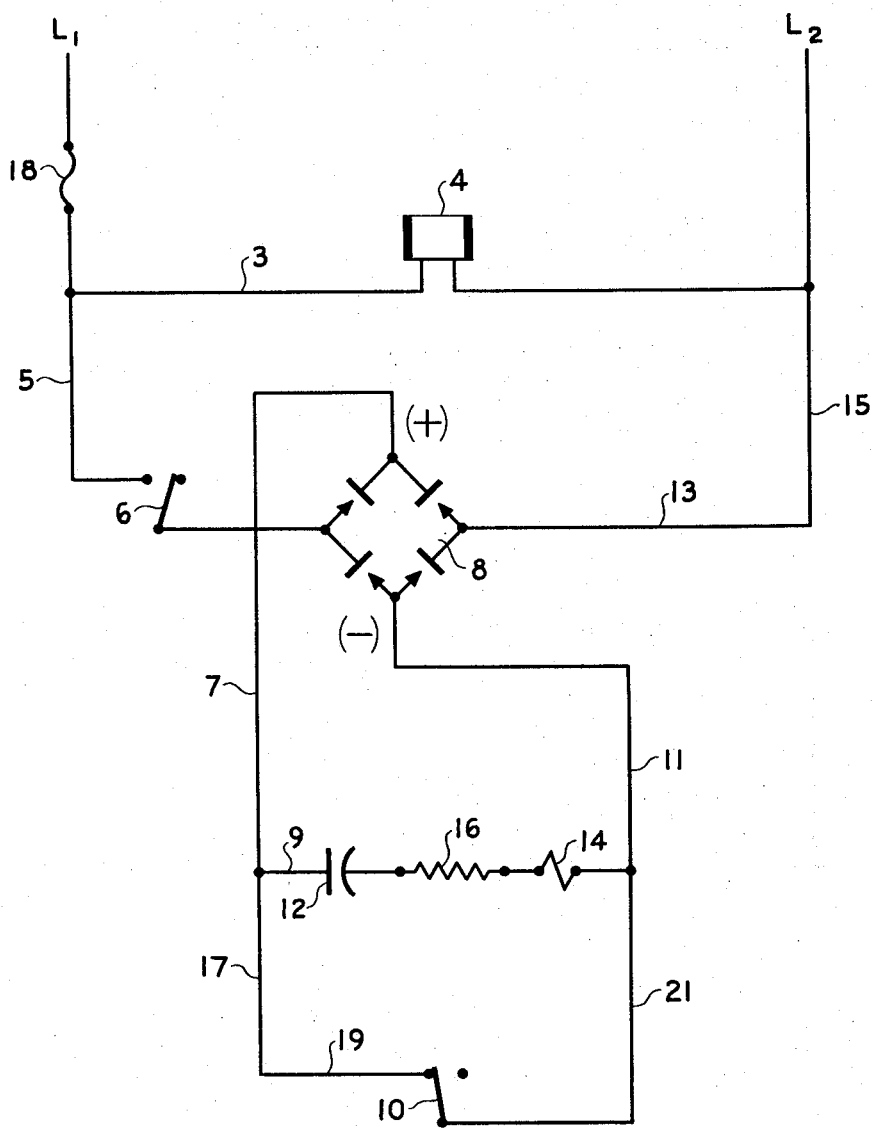

United States Patent Office 3,369,928
Patented Feb. 20, 1968

3,369,928
METHOD AND APPARATUS FOR USE WITH METAL TREATING SOLUTIONS
Michael S. Arlow, Livonia, Mich., assignor to The Hooker Chemical Corporation, Niagara Falls, N.Y., a corporation of New York
Filed May 5, 1966, Ser. No. 547,985
10 Claims. (Cl. 117—120)

This invention relates to a method and apparatus useful with metal treating solutions, and more particularly, relates to a control system for operating apparatus for formulating such metal treating solutions.

In the treating of metal surfaces to provide protective and/or paint base coatings thereon, it is commonly the practice to formulate the various treating solutions by diluting a concentrate material, generally with water, to provide a solution containing the desired concentration of the various chemical components used. Thereafter, the metal surfaces to be treated are brought into contact with the solutions, generally by immersing the metal surface in the solution or by spraying the solution on the surface. In the course of this procedure, the treating solutions are depleted both by virtue of the reaction of the chemicals in the solution with the metal surface and by the physical removal or drag out of solution on the metal surfaces. It is, therefore, necessary periodically to replenish the treating solutions, by adding additional chemicals thereto, in order to maintain the desired concentration of the solution components.

Although this replenishing can be done manually, in recent years, the automatic replenishing of such treating solutions has become increasingly prevalent. In such an automatic operation, the conductivity, pH, color, turbidity, concentration of one or more ions or the like, of the treating solution are automatically measured as the treating solution is used. A usable range of the particular bath characteristics being measured, such as conductivity or the like, which will provide a suitable concentration, has been previously determined. This desired range of concentration for the solution is then set up on automatic control equipment so that when the bath concentration varies from the pre-set range an electrical circuit will be energized which activates one or more pumps, which in turn supply additional amounts of one or more chemicals to the treating bath until the desired concentration in the bath is reestablished. Inasmuch as there is some latitude in the concentration of the treating solution which will still provide the desired coating action on the metal treated, the continuous addition of replenishing chemicals to the operating solution is not necessary and the pumps supplying these chemicals are run only intermittently as needed to maintain the bath concentration within the desired range.

Under normal operating conditions, the time intervals between pump operations may be sufficiently great that substantially all of the chemical solutions may drain out of the pump. Accordingly, when the pump is activated, there is often an appreciable time lapse between the starting of the pump and the time any chemical solution actually flows through the pump. Additionally, when the pump stops there is still some chemicals in it which may corrode or crystallize in the interior of the pump if it is not immediately removed. It is, therefore, desirable to provide means for automatically priming the pump with water when it is first activated and then automatically flushing the pump with water when it shuts off. Additionally, this means should also be "fail-safe" so that in the event of a power failure during the operation of the pump, the flushing action will still take place.

In the past, various control systems have been proposed for accomplishing these results. For the most part, however, these systems have been quite complex and expensive and frequently have not provided the "fail-safe" characteristics which are desirable to protect the pump from the action of the chemical solutions in the event of a power failure. These problems cannot be solved by the continuous addition of priming and/or flushing water to the pump, during the entire pumping cycle, because of the resulting dilution of the chemicals which are being added to the processing bath.

It is, therefore, an object of the present invention to provide an improved control system for operating pumps for supplying chemicals to a processing bath.

A further object of the present invention is to provide such an improved control system which effects an intermittent priming and flushing of the chemical pumps at the beginning and end of the pump operation cycle.

Another object of the present invention is to provide an improved method for operating chemical pumping apparatus.

These and other objects will become apparent to those skilled in the art from the description of the invention which follows.

Figure 2:
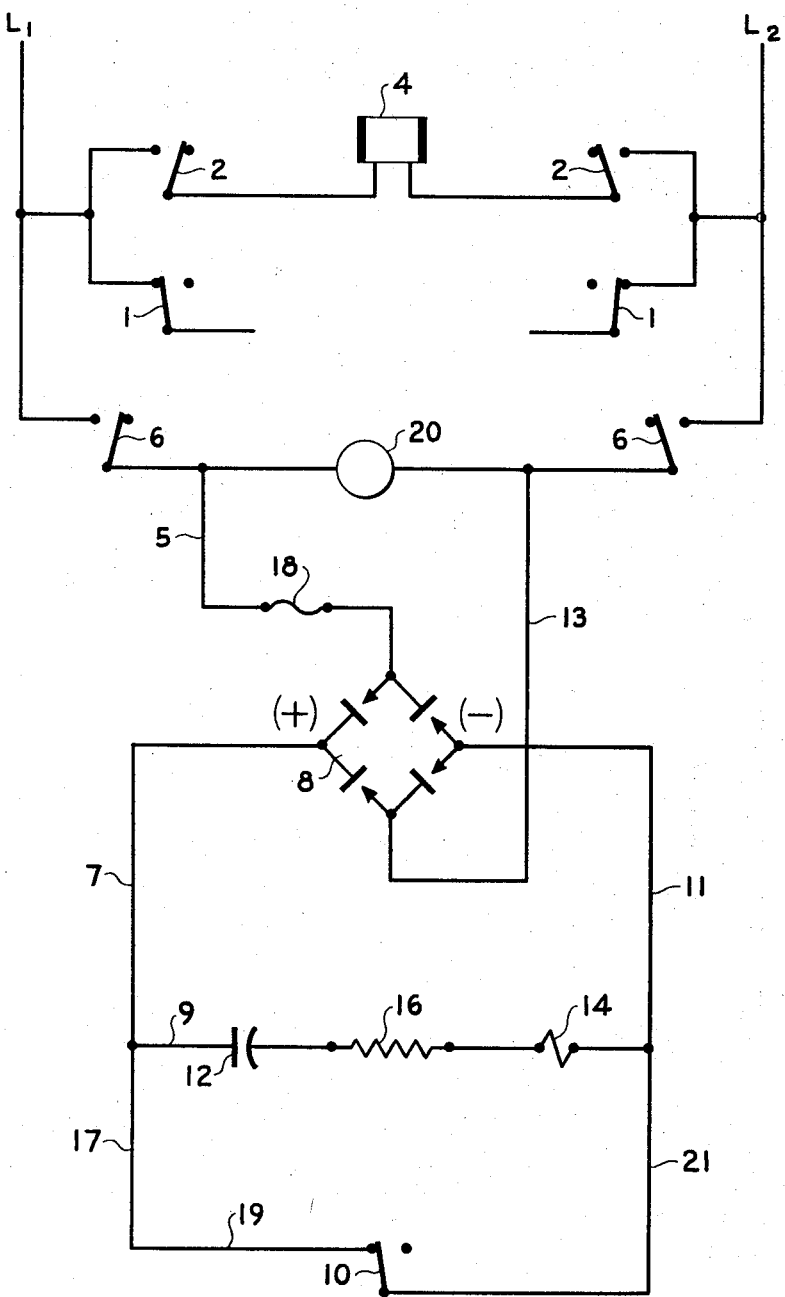

In the drawing which is attached hereto and forms a part hereof, FIGURE 1 is a schematic diagram of the electrical system of the control apparatus and FIGURE 2 is a schematic diagram of the electrical circuitry of a modification of the control apparatus of the present invention.

Pursuant of the above objects, the present invention includes a primary circuit comprising a source of DC current, an electrically actuated valve means connected in series with the DC current source, said valve means being activated from its normally closed position to an open position by the passage therethrough of current, an electrical valve and storage means disposed between the current source and the electrically activated valve means and being in series therewith, said valve and storage means being charged by the passage of current therethrough from the current source until the potential thereof becomes substantially equal to the potential of the current passing therethrough, whereupon the flow of current therethrough to the valve means is interrupted and the valve returns to its normally closed position, a secondary circuit comprising a relay member which is open when current is passed from the DC current source and closed when current flow from the curent source ceases, said secondary circuit being in series with the electrically activated valve means and the electrical valve and storage means and positioned so that upon cessation of current flow from the DC current source, current passes from the charged electrical valve and storage means through the secondary circuit to the electically activated valve means and maintaining it open until the potential of the charged valve and storage means is reduced sufficiently as to be ineffective to cause current flow through the circuit, whereupon current flow ceases and the valve returns to its normal closed position and relay control means for activating the relay member in the secondary circuit to an open position when DC current flows from the current source and to a closed position when the DC current flow ceases.

More specifically, in the apparatus of the present invention, the direct current may be supplied by any convenient direct current source, as for example, a direct current generator, a battery, or the like. Additionally, the current may originally be supplied as alternating current which is then rectified to provide the desired direct current, using any suitable rectification means, as for example, by passing the alternating current through a full wave rectifier bridge. In many instances, as will be explained more fully hereinafter, it has been found to be desirable to rectify alternating current to provide the direct current source.

The electrically actuated valve means which is used in the present invention may be any suitable valve member which is actuated from its closed to an open position by the application of electrical or electro magnetic energy. Typical of such electrically actuated valve means are various solenoid valves, as are known to those in the art. Exemplary of such solenoid valves which may be used are those which are spring biased in the closed position and upon the application of electric current, an electro magnet is activated which applies sufficient force to the valve closure member to overcome the spring force, thus opening the valve. In such valves, when the current flow ceases, the force of the spring again becomes sufficient to close the valve. Similarly, the electrical valve and storage means may be any suitable member through which a direct current may be passed until a predetermined charge is built up in the member whereupon the current flow is interrupted. Typical of such electrical valve and storage means are capacitors or condensers and these or other similar valve and storage means may be used in the present invention.

Accordingly, in its most preferred embodiment, the present invention includes a full wave bridge rectifier to rectify alternating current to provide a source of direct current, which rectifier is in series with a capacitor and a solenoid valve, which valve is normally in a closed position, and, as has been described hereinabove, a secondary circuit which contains a relay member.

In operation, the flow of alternating current through the control relay closes the relay circuit through rectifier and opens the relay member in the secondary circuit, so that direct current flows through the capacitor and solenoid valve in the primary circuit. This flow of current activates the solenoid valve from its normally closed position to an open position. The solenoid valve remaining in the open position until the capacitor has been charged to the point that the potential thereof approaches the potential of the current flowing through the circuit whereupon the current flow through the solenoid is insufficient to hold the valve open and the valve returns to its normally closed position.

The components of the circuit remain in this position so long as alternating current is flowing through the control relay and rectifier circuit. When this flow of current is stopped, the relay opens the primary circuit and closes the secondary circuit causing a direct current to flow from the storage capacitor through the solenoid valve actuating it from its normally closed position to an open position. The valve again remains in this open position until the storage capacitor potential has been sufficiently reduced so as to be ineffective in causing sufficient current to flow through the solenoid valve coil. At this time the solenoid valve returns to its normally closed position.

It is to be appreciated that in addition to the components which have been set forth hereinabove, the primary and secondary circuits of the present invention may also contain resistors which may be placed in either circuit, either before or after the capacitor. In this manner, by the choice of the number and size of the resistors, as well as by the choice of the size of the capacitor, the time interval during which the solenoid valve remains open may be varied as desired.

In applying the control system of the present invention, as has been described hereinabove, to the operation of chemical pumping apparatus, the solenoid valve system is placed in a liquid line which is connected to a suitable pump, so that when the valve is opened, water or other suitable liquid is supplied to the pump. Preferably, the motor for the pump is connected to a source of alternating current, such as the normal 120 volt 60 cycle alternating current. A relay control number is disposed in the same circuit with the pump motor so that upon the passage or cessation of current through the pump motor, the relay control is actuated. A relay member, which is normally open, is disposed in series with the relay control member so that upon the passage of current through the pump motor, the relay control member activates the relay to close it, thereby permitting the passage of alternating current through the relay to a full wave bridge rectifier, wherein the alternating current is rectified to direct current. From the rectifier, which serves as the source of direct current to operate the electrical system of the present invention, the direct current flows through the capacitor and the solenoid valve, actuating the solenoid valve from its normally closed position, in the manner which has been described hereinabove. Thus, when the pump motor is activated, as for example in response to a need for adding replenishment chemicals to a metal coating bath, the relay control member is also activated to close the relay permitting the ultimate passage of current through the capacitor to the solenoid valve which is opened permitting water to flow into the pump to prime it. This flow of current continues until the capacitor becomes fully charged as has been described hereinabove. The flow of current through the capacitor and solenoid valve circuit then ceases and the solenoid valve closes shutting off the flow of water, even though the pump motor continues to run.

When the proper concentration of component has again been established in the metal treating solutions, as determined by the conductivity measuring or measuring devices or other means, the flow of current to the pump motor is stopped. This again activates the relay control member which then opens the closed relays and closes those which are open so that the charged capacitor now discharges through the secondary circuit and back through the solenoid valve, reopening it, as has been described above. In this manner, water is again supplied to the pump, this time to flush it, and the flow of water continues until the capacitor has discharged sufficiently that the circuit reaches substantially equilibrium conditions. At this time, the solenoid valve closes, shutting off the water flow to the pump.

Referring now to the drawings which are attached hereto and form a part hereof, FIGURE 1 is a circuit diagram of the electrical system of the present invention. As shown in this figure, $L_1$ and $L_2$ are a 120 volt 60 cycle alternating current line through which current flows to the relay control member 4 by way of line 3. The current passing through the relay control member activates the relay 6 to close it and the relay 10, to open it. The alternating current thereafter, flows through line 5, through the now closed relay 6 to the full wave bridge rectifier 8, wherein it is rectified to direct current. From the rectifier, the direct current passes through the capacitor 12, by means of lines 7 and 9, flows from the capacitor, through the resistor 16 to the solenoid valve 14. Current actuates the solenoid valve, which is normally closed, to an open position, the current flow continuing to complete the circuit through line 11. As the capacitor 12 becomes charged by the passage therethrough of the current, a point is reached wherein the potential of the capacitor is substantially equal to the potential of the current flowing through the lines 7, 9 and 11. When this happens, further current flow through the circuit ceases and the solenoid valve 13 returns to its closed position. The circuit remains in this condition so long as the alternating current continues to flow through the relay control member 4 by means of lines $L_1$, 3 and $L_2$.

When the current flow ceases, so that there is no current flowing through the relay control 4, the control is again activated, this time to close relay contact 10 and open relay contact 6. This completes the circuit through lines 9, 17, 19 and 21 so that current now flows through this circuit from the charged capacitor and through the solenoid valve 14 and the resistor 16, thus again opening the solenoid valve. This flow of current continues until substantially equilibrium conditions have been reached in the circuit and the charge on the capacitor 12 is no longer sufficient to cause the flow of current through the circuit. At this point, the solenoid valve 14 again closes, and the system remains unchanged until the current is again passed through the control relay 4.

Referring now to FIGURE 2, this is an electrical diagram of another embodiment of the circuit of the present invention, as it is used in combination with an electrical motor, for use with a pump. As shown in this figure, a control relay, 4, is positioned external of the main circuit of the electrical system of the present invention. This relay control is controlled by conductivity sensing devices in a chemical processing tank, (not shown) which open the relay contacts 1 and close the contact 2 to actuate the relay control 4 when additional replenishing chemicals are required in the processing tank. At this time, the relay control activates the relay contacts 6 to close them, and at the same time opens the relay contact 10. This permits the passage of the 120 volt 60 cycle alternating current in the lines $L_1$ and $L_2$ to the pump motor 20 and at the same time passes alternating current through the line 5 and fuse 18 to the bridge rectifier 8, wherein the alternating current is rectified to direct current. Thereafter, the direct current flows from the rectifier 8 through line 7 and 9 to the capacitor 12 and resistor 16, through the solenoid valve 14 and back through lines 11 to the rectifier bridge, as has been described hereinabove. The operation of this circuit then continues in the manner as has been described hereinabove with regard to FIGURE 1, with the current continuing to flow through the capacitor 12 to the solenoid valve 14 until the potential built up in the capacitor is approximately the same as the potential in the circuit. At this point, the current flow is stopped and the solenoid valve 14 closes. When the alternating current to the pump motor 20 is stopped, the control relay 4 is again activated and actuates the relay contacts 6 to open them and also closes relay contact 10. The capacitor 12 then discharges through lines 9, 17, 19 and 21 to the solenoid valve 14, again opening it. This condition is maintained until the potential of the capacitor has been sufficiently reduced so that it is no longer effective in causing current flow through the circuit. The solenoid valve 14 is then again closed and the system remains unchanged until the relay control is again activated.

In order that those in the art may better understand the present invention and the manner in which it may be practiced, the following specific examples are given. In these examples, temperatures are given in degrees centigrade and parts and percents are by weight. It is to be appreciated, that these examples are intended merely as being exemplary of the present invention and are not to be taken as a limitation thereof.

*Example 1*

An aqueous chromating solution was formulated containing the following components in the amounts indicated:

| Components: | Percent |
| --- | --- |
| Chromate ($CrO_3$) | 0.25 |
| Potassium ferricyanide | 0.04 |
| Fluoride ion | 0.4 |
| Dissolved aluminum | 0.1 |

This solution was applied to Type 3015 aluminum alloy sheet using the apparatus and procedure, including the conductivity control equipment, as described in Example 1 of copending U.S. application S.N. 333,161, filed Dec. 24, 1963, now Patent No. 3,312,189. The components of the coating solution were replenished during the coating of the aluminum alloy sheet using two aqueous replenishing concentrates, one containing 5% of chromic acid and 2.7% hydrofluoric acid and the second containing 20% potassium ferricyanide. Each of these replenishing solutions was maintained in a tank equipped with a pump for supplying the replenishing solution, as required, to the operating coating bath. Both of these pumps was equipped with a water line for supplying priming and flushing water to the pump, which water line contained a solenoid valve and the automatic control equipment therefor as shown in FIGURE 2, described hereinabove. In this control system, the capacitor was a 2700 microfarad capacitor, the resistor was a 750 ohm ten-watt resistor, the solenoid valve had a 60 volt DC opening voltage, the fuse was rated at 1 amp and the full wave rectifier bridge was rated at 200 volt DC at one amp. As the aluminum alloy sheet was coated in the metal treating solution, the solution was periodically automatically replenished with the replenishing solution so that the concentration of hexavalent chromium, potassium ferricyanide, and fluoride ions in the operating solution was maintained within about 0.01% of the actual concentration of these materials in the solution. In each instance, as replenishing materials were added to the operating solution, the electrical control system of the present invention operated to open the solenoid valve and supply water for the pump when the pump motor started for a period of about 7 seconds, after which time the solenoid valve closed, shutting off the water flow. Additionally, when the pump motor was stopped, the electrical system of the present invention again opened the solenoid valve and supplied water for flushing the pump for a period of about 7 seconds, after which time the solenoid valve again automatically closed, shutting off the water flow.

*Example 2*

The procedure of the preceding example was repeated with the exception that the conductivity measuring control apparatus used was that described in Example 1 of copending U.S. application S.N. 333,058 filed Dec. 24, 1963 and the metal coating solution was a phosphate solution containing the following components in the amounts indicated:

| Components: | Percent |
| --- | --- |
| Zinc ion | 0.25 |
| Nickel ion | 0.2 |
| Phosphate ion ($PO_4$) | 1.2 |
| Nitrate ion ($NO_3$) | 0.35 |
| Fluoride ion (F) | 0.2 |

During the treating of the metal workpieces with the coating solutions, the components of the coating bath are replenished as in the previous example, the pump for the replenishing solution being automatically supplied with priming and flushing water using the automatic control system of the present invention as shown in FIGURE 2. The components of this control system were the same as in Example 1 and in each instance of the activation of the pump for supplying replenishing chemical, priming water was supplied for a period of about 7 seconds when the operation of the pump was first initiated and flushing water was supplied for a period of about 7 seconds after the pump motor was stopped.

It is to be appreciated that the automatic control system of the present invention is effective in overcoming the problems which have been heretofore encountered in such systems in that it provides a simple method for priming a chemical pump when it begins operation and also for flushing the pump when the operation is completed. It is to be further appreciated that this flushing action will take place regardless of whether the operation of the pump stops due to the normal operation of the control system or because of a power failure. This "fail-safe" feature of the system of the present invention is quite important and is one which has often been lacking in systems of the prior art.

While there have been described various embodiments of the invention, the methods and apparatus described are not intended to be understood as limiting the scope of the invention, as it is realized that changes therewithin are possible and it is further intended that each element recited in any of the following claims is to be understood as referring to all equivalent elements for accomplishing substantially the same results in substantially the same

What is claimed is:

1. An electrical control system useful in controlling the flow of liquid priming and flushing media to chemical pumping apparatus which comprises a primary circuit comprising a source of direct current, an electrically actuated valve means connected in series with the direct current source, said valve means being activated from its normally closed position to an open position by the passage therethrough of current, an electrical valve and storage means disposed between the current source and the electrically activated valve means and being in series therewith, said valve and storage means being charged by the passage therethrough of current from the current source until the potential thereof becomes substantially equal to the potential of the current passing therethrough, whereupon the flow of current therethrough to the valve means is interrupted and the valve returns to its normally closed position, a secondary circuit comprising a relay member which is open when the current is passed from the direct current source and closed when current flow from the current source ceases, said secondary circuit being in series with the electrically activated valve means and the electrical valve and storage means and positioned so that upon cessation of current flow from the direct current source, current passes from the charged electrical valve and storage means through the secondary circuit to the electrically activated valve means, thus opening the valve means and maintaining it open until the potential of the charged valve and storage means is reduced sufficiently as to be ineffective to cause current flow through the circuit, whereupon current flow ceases and the valve returns to its normal closed position, and relay control means for activating the relay member in the secondary circuit to an open position when direct current flows from the current source and to a closed position when the direct current flow ceases.

2. The electrical control system claimed in claim 1 wherein the electrically activated valve means is a solenoid valve and the electrical valve and storage means is a capacitor.

3. Chemical pumping apparatus comprising a pump, electrical means for activating the pump, means for supplying priming and flushing liquid to the pump and the electrical control system as claimed in claim 1, the electrical control system being disposed so that the electrically actuated valve thereof controls the flow of priming and flushing liquid to the pump and being further disposed so that activation of the pump causes direct current to flow through the control system from the direct current source and deactivation of the pump causes cessation of said direct current flow from the direct current source.

4. The chemical pumping apparatus as claimed in claim 3, wherein the electrical means for reactivating the pump is an electric motor, the electrically actuated valve is a solenoid valve and the electrical valve and storage means is a capacitor.

5. A method of supplying priming and flushing liquid to a pump which comprises providing a pump with a conduit suitable for passing a priming and flushing liquid therethrough, said conduit having disposed therein an electrically actuated valve for controlling the flow of liquid therethrough, said valve normally being in a closed position, activating said pump, substantially simultaneously passing a direct current through an electrical valve and storage means to the electrically activated valve, thereby opening said valve and permitting priming liquid to flow to said pump, continuing passage of said direct current through the electrical valve and storage means until the potential thereof becomes substantially equal to the potential of the current passing therethrough, whereupon the flow of current to the valve means is interrupted and the valve returns to its normally closed position, thereby interrupting the flow of liquid to the pump, thereafter, upon deactivation of said pump, discharging the charged electrical valve and storage means through a secondary circuit to the electrically actuated valve, thereby again opening said valve and permitting flushing liquid to flow to the pump, and continuing the discharge of the electrical valve and storage through the secondary circuit until the potential of the valve and storage means is reduced sufficiently as to be ineffective to cause further current flow through the secondary circuit, thereby closing the electrically actuated valve means, interrupting the flow of flushing liquid to the pump.

6. The method as claimed in claim 5 wherein the pump is actuated by an electric motor operated by alternating current, the alternating current also being rectified to direct current to provide the direct current passed through the electrical valve and storage means, the electrical valve and storage means is a capacitor and the electrically activated valve is a solenoid valve.

7. The method as claimed in claim 6 wherein the priming and flushing liquid is water.

8. A method of coating a metal surface which comprises contacting the surface to be coated with a coating solution, periodically replenishing the coating solution with additional amounts of coating material to compensate for those consumed by pumping replenishing coating materials into the main body of the coating solution and supplying priming and flushing liquid to the pump for the replenishment coating materials in accordance with the process of claim 6.

9. The method as claimed in claim 8 wherein the pump for the replenishment coating materials is activated by an electric motor operated by alternating current, the alternating current also being rectified to direct current to provide the direct current passed through the electrical valve and storage means, the electrically activated valve is a solenoid valve and the electrical valve and storage means is a capacitor.

10. The method as claimed in claim 9 wherein the priming and flushing liquid is water.

References Cited

UNITED STATES PATENTS

| 3,198,123 | 8/1965 | Wilkinson et al. | 103—204 |
| 3,238,891 | 3/1966 | Thier et al. | 103—203 |

ROBERT M. WALKER, *Primary Examiner.*